(No Model.)
J. C. SCHULTE.
TREE SAWING MACHINE.
No. 402,036. Patented Apr. 23, 1889.
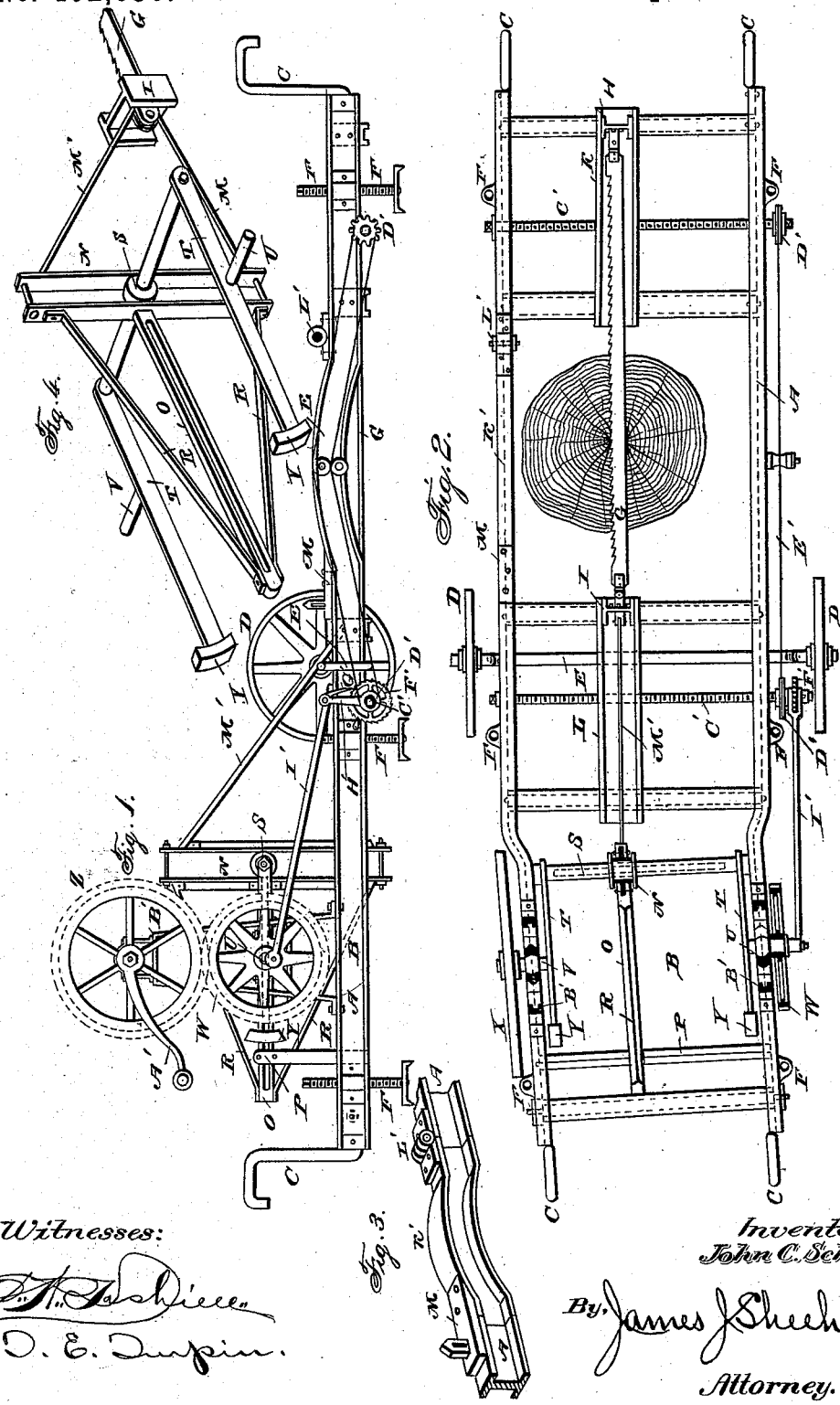
Witnesses:
Inventor:
John C. Schulte
By James J. Sheehy
Attorney.

UNITED STATES PATENT OFFICE.

JOHN C. SCHULTE, OF LITTLE ROCK, ARKANSAS.

TREE-SAWING MACHINE.

SPECIFICATION forming part of Letters Patent No. 402,036, dated April 23, 1889.

Application filed October 30, 1888. Serial No. 289,553. (No model.)

*To all whom it may concern:*

Be it known that I, JOHN C. SCHULTE, a citizen of the United States, residing at Little Rock, in the county of Pulaski and State of Arkansas, have invented certain new and useful Improvements in Tree-Sawing Machines; and I do declare the following to be a full, clear, and exact description of the invention, such as will enable others skilled in the art to which it appertains to make and use the same.

This invention relates to improvements in sawing-machines designed especially for sawing trees; and it consists in certain constructions and arrangements of various parts hereinafter described.

In the drawings, Figure 1 is a side elevation of the machine. Fig. 2 is a plan view partially in section. Fig. 3 is a perspective of the hinged section of the frame. Fig. 4 is a perspective view of the reciprocating saw-operating frame and parts removed from the main frame.

The frame A may be constructed of any suitable material—such as angle-iron—and is preferably rectangular in form, with one end, B, narrower than and at an angle to the main portion. Handles C are provided at each end of the frame, and wheels D are mounted on a crank-axle, E, near the center of the frame, so that the entire device may be readily moved from place to place. When in the desired position, the frame is supported on adjusting-screws F, mounted in the sides of the frame at any suitable points. A saw, G, is connected at the ends to cross-heads H and I, mounted to travel in ways K L. The saw is reciprocated longitudinally by means of pitmen M M', connected to an upright frame, N, which is provided with a slotted guide-bar, O, supported by a rod, P, on posts raised on the part B of the main frame A. The frame N is braced by rods R, fixed to the ends of the said frame and bar O. The rod P passes through the slot in the said bar O. Arranged to travel longitudinally within the frame N is the transverse portion S of an approximately U-shaped frame. This frame comprises side arms or extensions, T, which are secured at their forward ends to the opposite ends of the bar S, and are also connected to short shafts U and V, respectively, the shaft U carrying a cog-wheel or pulley, W, and the shaft V a fly-wheel, X. The extensions T are continued beyond the said shafts and carry counter-weights Y. Motion is imparted to the cog-wheel W by means of a gear or pulley, Z, driven by a handle, A', or, if steam-power be used, by a suitable pulley.

B' B' are the standards on which the shafts U V and the shaft of the wheel Z are mounted.

The ways K L are moved laterally by screw-rods C' C', mounted in the frame A and carrying sprocket-wheels D' D', connected by a chain, E'. One of the rods C' is provided with a ratchet-wheel, F', driven by a pawl, G', pivoted to one end of an arm, H', which in turn is pivoted on the rod C'. The arm H', with the pawl G', is reciprocated by a pitman, I', pivoted on the shaft U to one side of its center.

One side of the frame A, opposite the saw, has a portion, K', pivoted at L', and normally held by a latch, M'.

It will be noticed that the two ways K L are not in line and that the saw is connected near one side of the cross-head H, so that the saw has a lateral advancement during the forward reciprocation, and retreats from the tree on which it is working when moved in the other direction, so that the positive feed of the ways may be made without binding the saw.

To place the machine in operative position, the part K' is lifted and the machine moved sidewise until the tree to be sawed is within the space occupied by the saw, after which the part K' may be lowered and latched. The frame is then adjusted by means of the adjusting-screws and the saw operated to cut the tree.

Having described my invention, what I claim is—

1. In a sawing-machine, the combination, with the saw and supporting-frame, of the approximately U-shaped frame having side arms provided with short lateral shafts, the said arms also having counterbalance-weights at their rear ends, the frame N, the slotted rearwardly-extending branch O, and the pitman connecting the frame with the saw, substantially as specified.

2. In a sawing-machine, the combination, with the frame A, having the pivoted part K' and angle portion B, of a reciprocating saw, guiding-ways for the saw arranged out of line, and a driving-gear mounted on the angle portion of the frame, substantially as specified.

3. In a sawing-machine, the combination of the frame A, saw G, ways K L, out of line one with the other, screw feed-rods C', frame N, connected to the saw, crank-shaft S T, shafts U V, for said crank-shaft, pitman I', connected to the shaft U, pawl G' and ratchet F', and means, substantially as described, for imparting motion to the several parts, as set forth.

In testimony whereof I affix my signature in presence of two witnesses.

JOHN C. SCHULTE.

Witnesses:
ALBERT COHEN,
HERMAN RÖBER.